(12) United States Patent
Nishita

(10) Patent No.: US 8,826,552 B2
(45) Date of Patent: Sep. 9, 2014

(54) SURVEY SETTING POINT INDICATING DEVICE

(75) Inventor: Nobuyuki Nishita, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 341 days.

(21) Appl. No.: 13/445,152

(22) Filed: Apr. 12, 2012

(65) Prior Publication Data

US 2012/0272536 A1 Nov. 1, 2012

(30) Foreign Application Priority Data

Apr. 28, 2011 (JP) .................. 2011-101911

(51) Int. Cl.
| | |
|---|---|
| G01C 5/00 | (2006.01) |
| G01C 15/06 | (2006.01) |
| G01C 15/00 | (2006.01) |
| G01C 15/10 | (2006.01) |

(52) U.S. Cl.
CPC .............. *G01C 15/06* (2013.01); *G01C 15/002* (2013.01); *G01C 15/004* (2013.01); *G01C 15/105* (2013.01)
USPC .............................. 33/290; 33/228

(58) Field of Classification Search
CPC ...... G01C 15/002; G01C 15/004; G01C 1/02; G01C 15/00; G01C 5/00
USPC .................... 33/290, 293, 286, 228
See application file for complete search history.

(56) References Cited

U.S. PATENT DOCUMENTS

| | | | | |
|---|---|---|---|---|
| 5,182,863 | A | * | 2/1993 | Rando .............................. 33/227 |
| 7,841,094 | B2 | * | 11/2010 | Schumacher .................. 33/282 |
| 2010/0186243 | A1 | * | 7/2010 | Schumacher .................. 33/228 |
| 2010/0212169 | A1 | | 8/2010 | Fleenor et al. |
| 2012/0272536 | A1 | * | 11/2012 | Nishita .......................... 33/290 |
| 2012/0272537 | A1 | * | 11/2012 | Nishita .......................... 33/293 |

FOREIGN PATENT DOCUMENTS

| | | |
|---|---|---|
| EP | 1503176 A2 | 2/2005 |
| JP | 3-27310 U | 3/1991 |
| JP | 7-159170 A | 6/1995 |
| JP | 2001-227950 A | 8/2001 |
| JP | 2004-317406 A | 11/2004 |
| JP | 2005-30789 A | 2/2005 |
| JP | 2005-43088 A | 2/2005 |
| JP | 2007-187857 A | 7/2007 |
| JP | 2009-204557 A | 9/2009 |
| JP | 2009-236663 A | 10/2009 |

OTHER PUBLICATIONS

Topcon Positioning Systems, Inc., FC-250 Catalog, "Windows Mobile 6.5 Field Controller", 2009, 2 pages.
Extended European Search Report mailed Aug. 23, 2012 in corresponding European Patent Application No. 12163890.2.

* cited by examiner

*Primary Examiner* — Yaritza Guadalupe-McCall
(74) *Attorney, Agent, or Firm* — Neilds, Lemack & Frame, LLC

(57) ABSTRACT

A survey setting point indicating device comprises a support member 3 which can be tilted with respect to a vertical direction, a connecting member which can be freely tilted with respect to the support member and hangs vertically downward by gravity, a laser pointer 7 which is provided at a lower end of the connecting member, is concentric with an axis of the connecting member and emits a laser beam vertically downward, and a reflector 5 provided such that the axis of the connecting member passes through a center of the reflector.

8 Claims, 6 Drawing Sheets

SURVEY SETTING POINT INDICATING DEVICE

BACKGROUND OF THE INVENTION

The present invention relates to a survey setting point indicating device used for a survey work, for instance, an operation such as a determination of a survey setting point or the like.

In a survey work, for example, a survey setting work for driving a pile in a survey setting point, a surveying instrument is set in a known point, and the surveying instrument indicates the survey setting point (coordinates) and communicates an information of the survey setting point to a worker (hereinafter a pile driving worker) who drives a pile in the survey setting point.

The pile driving worker supports a survey setting point indicating device, and the surveying instrument measures a position of the survey setting point indicating device and communicates, to the pile driving worker, a deviation between the current position of the survey setting point indicating device and the survey setting point. The pile driving worker supports the survey setting point indicating device in a position in which deviation comes to be eliminated and determines a point indicated by the survey setting point indicating device as the survey setting point.

As a conventional survey setting point indicating device, there is a pole fitted with a prism. A lower end of the pole indicates a survey setting point, and a surveying instrument measures the position of the prism. When a value measured by the surveying instrument coincides with a value of the survey setting point in a state in which the pole is vertically supported, the survey setting point is determined.

Therefore, the pole is provided with a tilting detector such as a bubble tube or the like to check whether the pole stands vertically or not.

For this reason, even when the value measured by the surveying instrument coincides with the value of the survey setting point, if the pole is tilted, it is necessary to correct the pole to stand vertically (perform leveling). When a tilting of the pole is adjusted from this condition, the position of the prism is displaced in a horizontal direction and is deviated from the survey setting point. Accordingly, it is necessary to adjust further the position of the survey setting point indicating device. Therefore, setting an accurate survey setting point has required troublesome operations, in which adjusting of the position of the survey setting point indicating device and leveling are repeated.

Incidentally, as the survey setting point indicating device in which a pole is equipped with a prism, there is a survey setting point indicating device disclosed in JP-A-2009-204557.

SUMMARY OF THE INVENTION

It is an object of the present invention to provide a survey setting point indicating device which can mark a survey setting point immediately if a position of a prism is determined.

To attain the above object, a survey setting point indicating device according to the present invention comprises a support member which can be tilted with respect to a vertical direction, a connecting member which can be freely tilted with respect to the support member and hangs vertically downward by gravity, a laser pointer which is provided at a lower end of the connecting member, is concentric with an axis of the connecting member and emits a laser beam vertically downward, and a reflector provided such that the axis of the connecting member passes through a center of the reflector.

Further, in the survey setting point indicating device according to the present invention, the support member is a rod-like member which can be rotated torsionally with a lower end of the support member as a center, a prism support part extends from the support member in a horizontal direction, and the connecting member is supported by the prism support part.

Further, in the survey setting point indicating device according to the present invention, the reflector is an omnidirectional prism which is fixed to the support member and has a space at a center portion, a spherical body is rotatably accommodated in the space, and the connecting member hangs down from the spherical body.

Further, in the survey setting point indicating device according to the present invention, at a top portion of the spherical body, a reflection part or a non-reflective part corresponding to a tilting limit of the connecting member is provided, a photosensor is provided so as to face the reflection part or the non-reflective part, and the tilting limit of the connecting member is detected by detecting a boundary of the reflection part or the non-reflective part by the photosensor.

Further, in the survey setting point indicating device according to the present invention, a first contact is provided on the connecting member, a second contact is provided on the omnidirectional prism in a portion facing the first contact, and a voltage is applied between the first contact and the second contact, and wherein when the connecting member is tilted and the first contact makes contact with the second contact, the tilting limit of the connecting member is detected.

Further, in the survey setting point indicating device according to the present invention, a hood is provided at a lower end of the omnidirectional prism, and the laser pointer is surrounded with the hood.

Further, in the survey setting point indicating device according to the present invention, the connecting member is provided in such manner that the connecting member can be freely tilted with respect to the support member, the reflector is an omnidirectional prism having a space at a center portion, the connecting member passes through the space, and the reflector is fixed to the connecting member.

Furthermore, in the survey setting point indicating device according to the present invention, at an upper end of the connecting member, another laser pointer is provided, and a laser beam is emitted upward from the another laser pointer.

According to the present invention, the survey setting point indicating device comprises a support member which can be tilted with respect to a vertical direction, a connecting member which can be freely tilted with respect to the support member and hangs vertically downward by gravity, a laser pointer which is provided at a lower end of the connecting member, is concentric with an axis of the connecting member and emits a laser beam vertically downward, and a reflector provided such that the axis of the connecting member passes through a center of the reflector. As a result, a center of the reflector is attached downward by the laser beam regardless of a state of the support member and a determination of a survey setting point becomes easy.

Further, according to the present invention, in the survey setting point indicating device, the support member is a rod-like member which can be rotated torsionally with a lower end of the support member as a center, a prism support part extends from the support member in a horizontal direction, and the connecting member is supported by the prism support part. As a result, it is possible to adjust easily a position projected by the laser beam by a tilting or a twist of the support member.

Further, according to the present invention, in the survey setting point indicating device, the reflector is an omnidirectional prism which is fixed to the support member and has a space at a center portion, a spherical body is rotatably accommodated in the space, and the connecting member hangs down from the spherical body. As a result, it is possible to make the configuration compact and to attach a center of the omnidirectional prism vertically downward regardless of a posture of the omnidirectional prism.

Further, according to the present invention, in the survey setting point indicating device, at a top portion of the spherical body, a reflection part or a non-reflective part corresponding to a tilting limit of the connecting member is provided, a photosensor is provided so as to face the reflection part or the non-reflective part, and the tilting limit of the connecting member is detected by detecting a boundary of the reflection part or the non-reflective part by the photosensor. As a result, it is possible to prevent an attached position of the laser beam from being adjusted outside of a tilting limit of the connecting member.

Further, according to the present invention, in the survey setting point indicating device, a first contact is provided on the connecting member, a second contact is provided on the omnidirectional prism in a portion facing the first contact, and a voltage is applied between the first contact and the second contact, and wherein when the connecting member is tilted and the first contact makes contact with the second contact, the tilting limit of the connecting member is detected. As a result, it is possible to prevent the attached position of the laser beam from being adjusted outside of the tilting limit of the connecting member.

Further, according to the present invention, in the survey setting point indicating device, a hood is provided at a lower end of the omnidirectional prism, and the laser pointer is surrounded with the hood. As a result, the laser pointer is prevented from swinging by the wind, and it is possible to perform a stable survey setting work.

Further, according to the present invention, in the survey setting point indicating device, the connecting member is provided in such manner that the connecting member can be freely tilted with respect to the support member, the reflector is an omnidirectional prism having a space at a center portion, the connecting member passes through the space, and the reflector is fixed to the connecting member. As a result, an axis of the connecting member passes through the center of the omnidirectional prism, and, when the connecting member is supported vertically, the laser beam reliably attaches the center of the omnidirectional prism.

Furthermore, according to the present invention, in the survey setting point indicating device, at an upper end of the connecting member, another laser pointer is provided, and a laser beam is emitted upward from the another laser pointer. As a result, it is possible to attach the survey setting point vertically upward.

BRIEF DESCRIPTION OF THE DRAWINGS

FIG. 7A shows a state in which the tilting is within the tilting limit and FIG. 7B shows a state in which the tilting exceeds the tilting limit.

DETAILED DESCRIPTION OF THE PREFERRED EMBODIMENTS

Description will be given below on an embodiment of the present invention by referring to the attached drawings.

Figure 1:
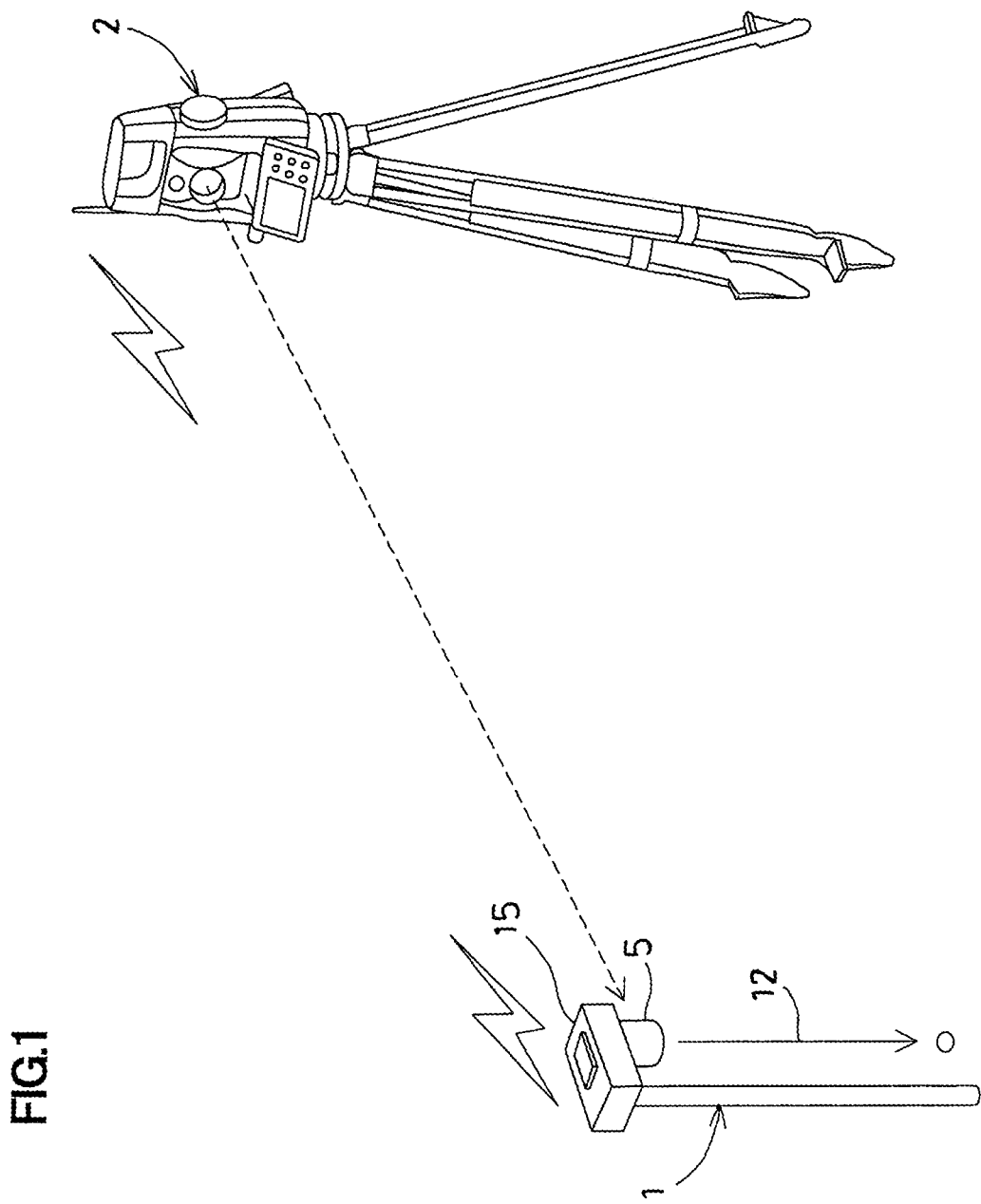
FIG. 1 is a schematical drawing of a surveying system provided with a survey setting point indicating device.

FIG. 1 shows a surveying system provided with a survey setting point indicating device according to the embodiment of the present invention. In the drawing, reference numeral 1 denotes a survey setting point indicating device, and reference numeral 2 denotes a surveying instrument, which is set in a known point. The survey setting point indicating device 1 and the surveying instrument 2 are provided with communication units which can send and receive an information necessary to perform a survey setting work.

The surveying instrument 2 measures a position of the survey setting point indicating device 1 (measurement coordinates), compares the measurement coordinates with a position in which pile driving is performed (pile driving coordinates), and sends a guidance information to a survey setting point indicating device 1 side so that the measurement coordinates coincide with the pile driving coordinates.

Figure 2:
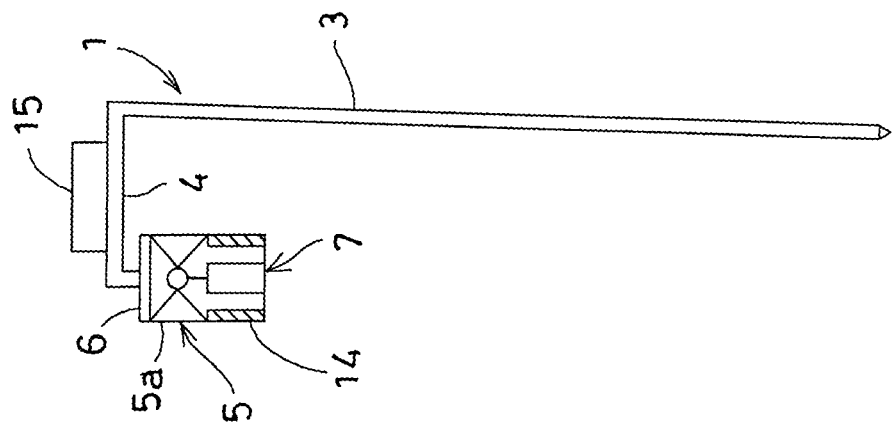
FIG. 2 is an elevational view of the survey setting point indicating device according to a first embodiment of the present invention.

Description will be given below on a first embodiment of the survey setting point indicating device 1 according to the present invention by referring to FIG. 2 and FIG. 3.

Reference numeral 3 denotes a rod-like support member. From an upper end of the support member 3, a prism support part 4 extends in a horizontal direction and an omnidirectional prism 5 is attached to a tip of the prism support part 4.

The omnidirectional prism 5 is formed of a plurality of triangular pyramid-shaped prisms 5a, which are assembled together in a radial fashion. The prisms 5a are held by a prism holder 6, and the prism holder 6 is fixed to the prism support part 4.

A space is formed at a center portion of the omnidirectional prism 5, and a laser pointer 7 is installed vertically from the space.

Figure 3:
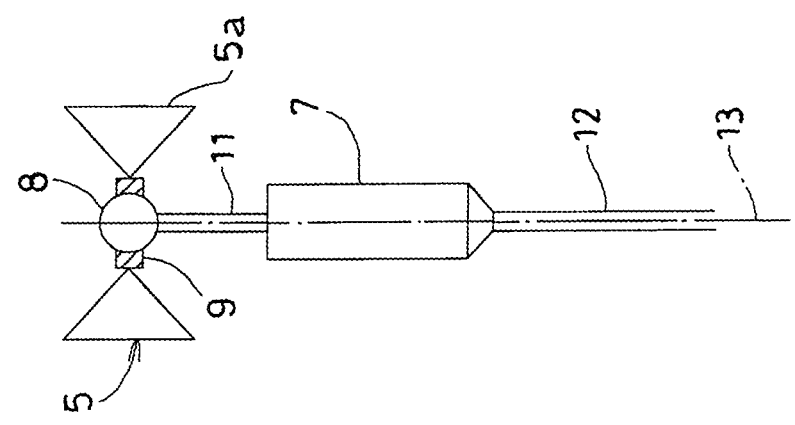
FIG. 3 is a schematical drawing of a principal portion of the survey setting point indicating device.

As shown in FIG. 3, a spherical body 8 is accommodated in the space, and the spherical body 8 is supported by a spherical seat 9 provided in the space. A center of the spherical body 8 coincides with a center of the omnidirectional prism 5 or approximately coincides with the center of the omnidirectional prism 5 while being displaced therefrom by an amount, which presents no problem for a measurement. A connecting member 11 with rod-like shape hangs down from the spherical body 8, and the laser pointer 7 is attached to a lower end of the connecting member 11. The connecting member 11 has a rigidity which can maintain a straight state.

An axis of the laser pointer 7 coincides with an optical axis 13 of a laser beam 12 emitted from the laser pointer 7, and the optical axis 13 is set so as to pass through the center of the spherical body 8. Moreover, in a state in which the spherical body 8 is supported by the spherical seat 9, the center of the spherical body 8 is configured to coincide with the center of the omnidirectional prism 5.

The spherical body 8 and the spherical seat 9 are members with a low frictional resistance, and a low-viscosity silicon grease or the like is applied to the spherical seat 9.

The laser pointer 7 forms a plumb-bob structure in which the laser pointer 7 itself serves as a weight, and the laser beam 12 emitted from the laser pointer 7 always points downward in a vertical direction. Moreover, length of the connecting member 11 is set at a length in such manner that the laser pointer 7 can serve as a weight.

At lower end of the prism 5, a hood 14 with tubular shape is provided and covers the laser pointer 7. The presence of the hood 14 prevents the laser pointer 7 from swinging by the wind. Moreover, a lower end of the hood 14 may be covered with a transparent member such as a transparent glass or a transparent synthetic resin or the like to have a liquid-tight structure. It is to be noted that, in a case where the survey setting point indicating device 1 is used in a state not being affected by the wind, the hood 14 may be omitted or removed.

On an upper surface of the prism support part 4, a guiding device 15 is provided. Incidentally, a position in which the guiding device 15 is provided is not limited to the upper surface of the prism support part 4 and may be a vertical portion of the support member 3. Moreover, the guiding device 15 may be made portable and is attached by means of a clip and it may be so designed that the guiding device 15 can be attached to and detached from the support member 3 appropriately in accordance with a usage state.

Figure 4:
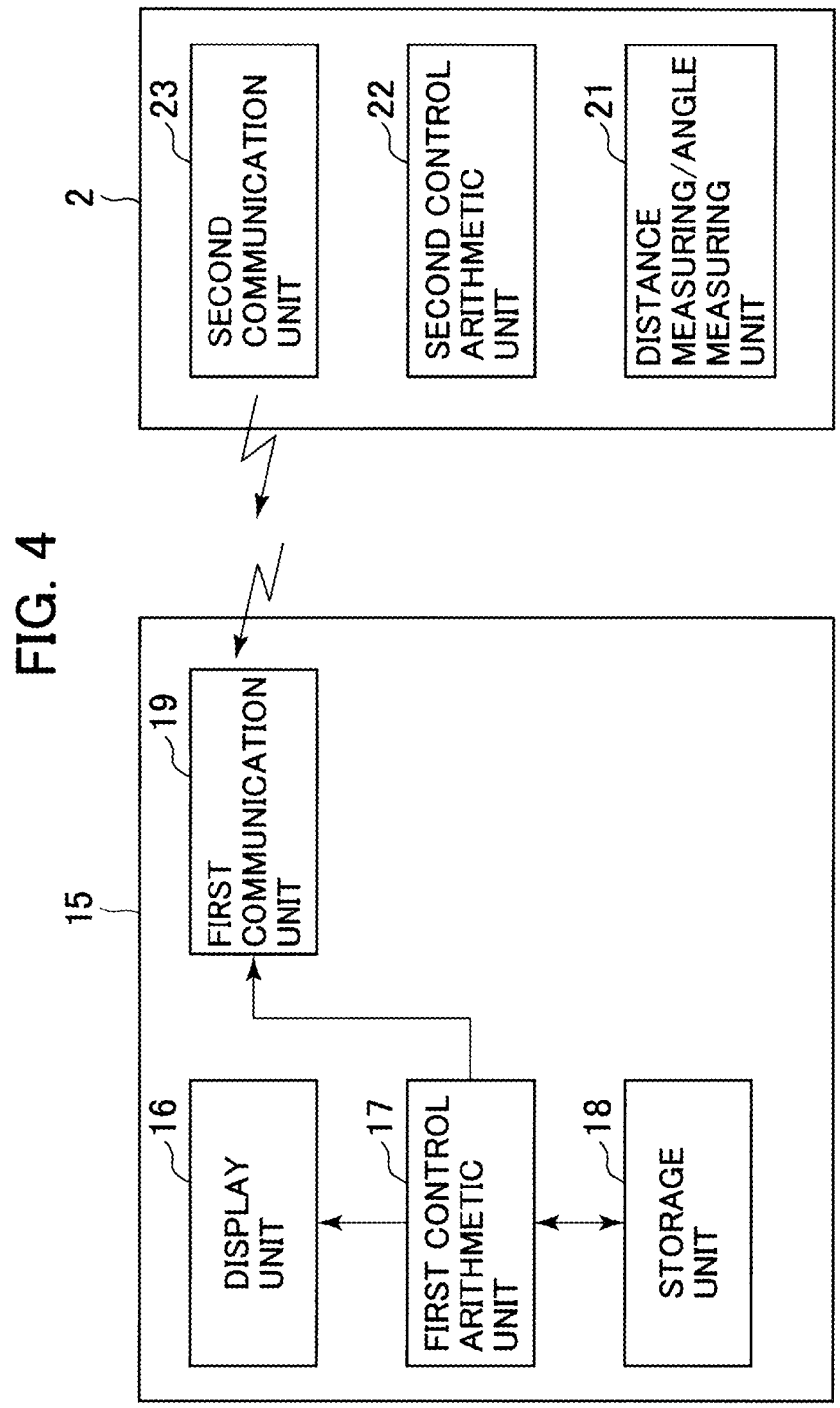
FIG. 4 is a schematical block diagram of the surveying system provided with the survey setting point indicating device according to the first embodiment.

As shown in FIG. 4, the guiding device 15 has a display unit 16, a first control arithmetic unit 17, a storage unit 18, and a first communication unit 19. Moreover, the surveying instrument 2 comprises a distance measuring/angle measuring unit 21, a second control arithmetic unit 22, and a second communication unit 23.

To the second control arithmetic unit 22, the coordinates of the survey setting point are input in advance. The position (the measurement coordinates) of the omnidirectional prism 5 is measured by the distance measuring/angle measuring unit 21, a measurement result is compared with the coordinates of the survey setting point, and the measurement result and an information regarding the coordinates of the survey setting point are sent to the guiding device 15 via the second communication unit 23 in real time by wireless communication.

The guiding device 15 receives the measurement result and the information regarding the coordinates of the survey setting point via the first communication unit 19. The first control arithmetic unit 17 displays on the display unit 16, the received coordinates of the survey setting point and the current position of the support member 3, that is, the current position of the omnidirectional prism 5. Or the first control arithmetic unit 17 calculates an amount of deviation between the current position and the coordinates of the survey setting point, a moving direction to make the amount of deviation be zero, or the like and displays the amount of deviation, the moving direction, or the like on the display unit 16.

The pile driving worker sets the survey setting point indicating device 1 in the survey setting point while checking the display of the display unit 16, marks the survey setting point on the ground, and further, drives a pile.

Moreover, the survey setting point indicating device 1, for example, the guiding device 15 may have a notification means such as a buzzer or the like and in a case where the position of the omnidirectional prism 5 coincides with the coordinates of the survey setting point or falls within an error range, the notification means produces a notifying sound or vibrates, and may notify the worker that the position of the omnidirectional prism 5 coincides with the survey setting point.

The surveying instrument 2 may be a surveying instrument with a tracking function or a surveying instrument without a tracking function. By the surveying instrument with a tracking function, one worker can perform pile driving.

Figure 5:
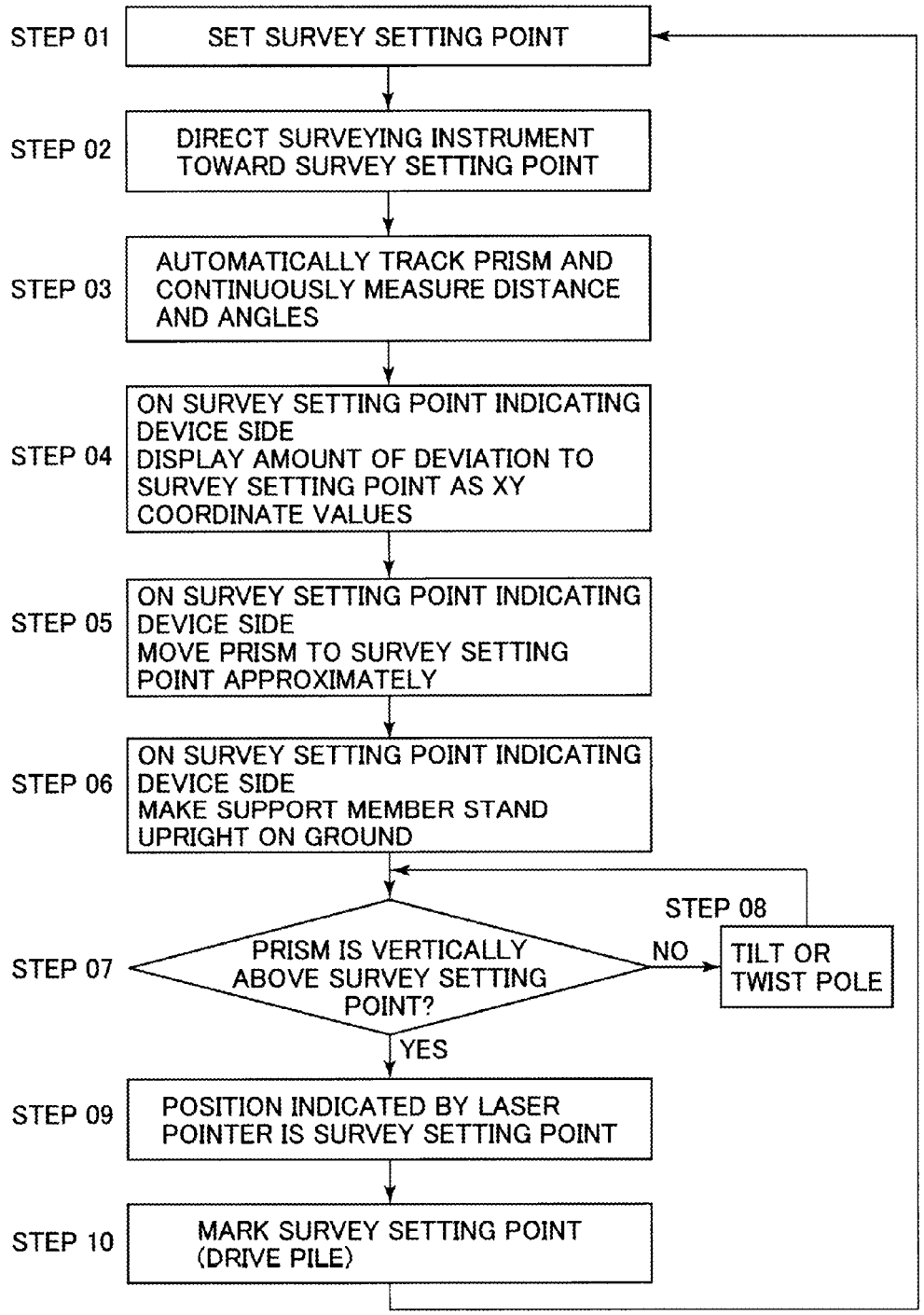
FIG. 5 is a flow chart of the first embodiment.

Next, description will be given on a case in which a survey setting work is performed by using a survey setting point indicating device 1 according to the first embodiment and a surveying instrument 2 with a tracking function, such as a total station by referring to FIG. 5.

(STEP 01) An information regarding a survey setting point is set and input to the surveying instrument 2.

(STEP 02) The surveying instrument 2 is directed toward the survey setting point, and the survey setting point indicating device 1 is held in a direction of the survey setting point.

(STEP 03) The surveying instrument 2 is operated and made to start tracking the omnidirectional prism 5. Concurrently with starting tracking the omnidirectional prism 5, the surveying instrument 2 continuously measures a distance to the omnidirectional prism 5 and the angles (a horizontal angle and a vertical angle) of the omnidirectional prism 5. A measurement result and coordinate data of the survey setting point are transmitted to the survey setting point indicating device 1.

(STEP 04) In the survey setting point indicating device 1, an amount of deviation between the current position and the survey setting point is calculated based on the information transmitted from the surveying instrument 2, and the amount of deviation is displayed. It is to be noted that, the amount of deviation is displayed as the XY coordinate values or an arrow indicating a direction of deviation, and length of the arrow may be varied depending on the amount of deviation.

(STEP 05, STEP 06) When the omnidirectional prism 5 gets closer to the survey setting point and the position of the omnidirectional prism 5 nearly coincides with the survey setting point, a support member 3 is made to stand upright on the ground.

(STEP 07) A position of the omnidirectional prism 5 is checked based on the measurement result of the surveying instrument 2 and is determined whether or not the omnidirectional prism 5 is positioned vertically above the survey setting point.

(STEP 08) In a case where the omnidirectional prism 5 is not vertically above the survey setting point, the support member 3 is tilted with respect to a vertical direction with a lower end of the support member 3 as a center or is rotated (twisted) with an axis of the support member 3 as a center, and the position of the omnidirectional prism 5 is adjusted so that the position of the omnidirectional prism 5 becomes vertically above the survey setting point.

(STEP 09) In a state in which it is confirmed that the omnidirectional prism 5 is vertically above the survey setting point, a laser beam 12 emitted from a laser pointer 7 is projected on the survey setting point.

(STEP 10) The survey setting point is marked (a pile is driven). One survey setting work is completed, and the procedure proceeds to the determination of a next survey setting point.

In the above-described survey setting point determination work performed by using the survey setting point indicating device 1, regardless of a posture (a tilting or a twist) of the support member 3, the laser pointer 7 always projects a laser beam on an area vertically below the center of the omnidirectional prism 5. Accordingly, since the worker does not pay attention to maintain a vertical posture of the support member 3 and it is enough for the worker to concentrate on making a position illuminated by the laser pointer 7 coincide with the survey setting point. Therefore, the workability is improved greatly.

Incidentally, the information of the survey setting point may be set and input to a storage unit 18 of a guiding device 15 in advance.

Figure 6:
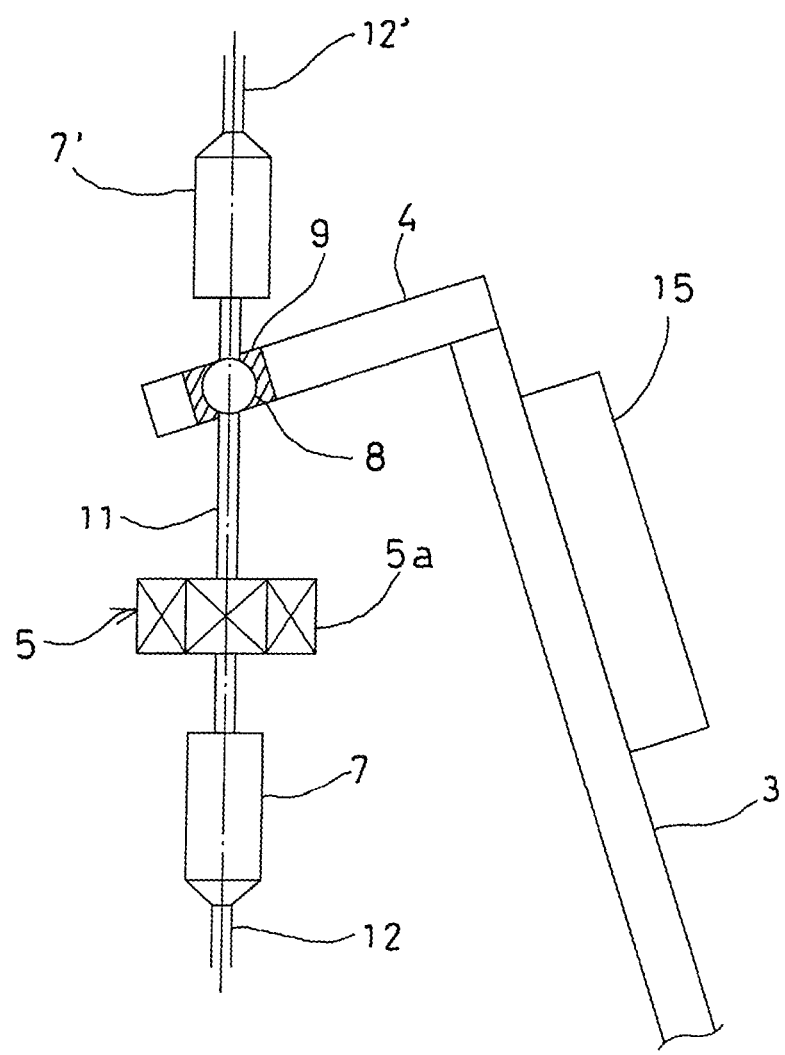
FIG. 6 is an explanatory drawing of a principal portion of a second embodiment.

FIG. 6 shows a second embodiment.

In the second embodiment, a laser pointer 7 is provided at a lower end of a connecting member 11, a laser pointer 7' is provided at an upper end of the connecting member 11, a laser beam 12 is emitted vertically downward from the laser pointer 7, and a laser beam 12' is emitted vertically upward from the laser pointer 7'. The connecting member 11 passes through a center of an omnidirectional prism 5.

A spherical body 8 is provided in an upper part of the connecting member 11, preferably, near the upper end of the connecting member 11, a spherical seat 9 is provided in a prism support part 4, and the spherical body 8 is supported by the spherical seat 9 in such manner that the spherical body 8 can be freely tilted in all directions. Therefore, a relation between the connecting member 11 and the prism support part 4 is that the connecting member 11 passes through the prism support part 4 in up-and-down direction and the connecting member 11 is supported by the prism support part 4 in such manner that the connecting member 11 can be freely tilted in all directions.

Moreover, the omnidirectional prism 5 is provided in a lower portion of the connecting member 11, preferably, near the lower end of the connecting member 11, and the omnidirectional prism 5 serves as a weight of the connecting member 11, and the axis of the connecting member 11 is always vertical. Therefore, the laser beams 12 and 12' emitted from the laser pointers 7 and 7' always emit vertically downward and vertically upward, regardless of the tilting of the support member 3 and transfer the position of the center of the omnidirectional prism 5 in a vertical direction.

It is to be noted that, in the second embodiment, in a case where there is no need to emit the laser beam 12' upward, the laser pointer 7' may be omitted.

Moreover, the omnidirectional prism 5 reflects a distance measuring light from a surveying instrument 2. Therefore, instead of the omnidirectional prism 5, a reflector having the function of reflecting the distance measuring light will suffice and it is not limited to an omnidirectional prism. For example, the omnidirectional prism 5 is replaced with a retroreflective sheet and an optical axis 13 of the laser beam 12 may be present on a surface (reflection surface) of the sheet.

As described above, in the present embodiment, the support member 3 is tilted and a position projected by the laser beam 12 is adjusted, and a tilting limit of the support member 3 is required to be within a tilting limit of the connecting member 11.

Therefore, a detecting means for detecting the tilting limit of the connecting member 11 may be provided.

Figure 7A:
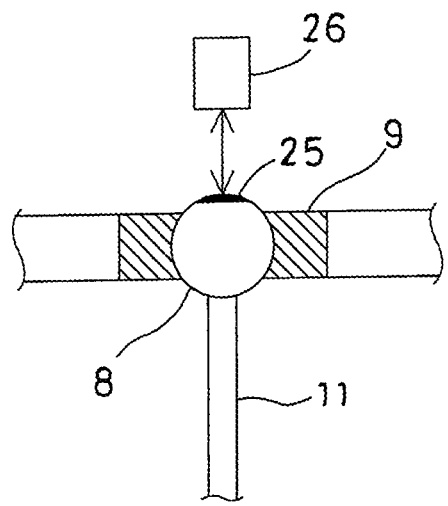
FIG. 7A and FIG. 7B are explanatory drawings of a principal portion of a first detecting means for detecting a tilting limit of a support member of the survey setting point indicating device.
Figure 7B:
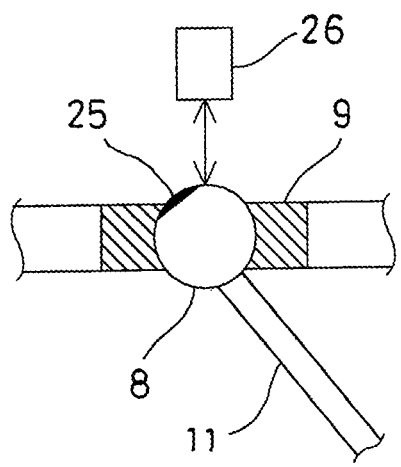

FIG. 7A and FIG. 7B show a first detecting means. A circular reflection part 25 is formed at a top portion of the spherical body 8, and a photosensor 26 is provided so as to face the top portion of the spherical body 8 (see FIG. 7A). The photosensor 26 emits a detection light. The photosensor 26 receives and detects a reflected detection light which is reflected from the reflection part 25.

When a range in which the reflection part 25 is provided is corresponded with the tilting limit of the connecting member 11 by the fact that the photosensor 26 detects a boundary of the reflection part 25, it is possible to detect the tilting limit of the connecting member 11. Therefore, when the photosensor 26 does not receive and detect the reflected detection light, it is judged that the connecting member 11 exceeds the tilting limit, that is, the support member 3 exceeds the tilting limit (see FIG. 7B).

Incidentally, a predetermined range of the top portion of the spherical body 8 may be formed as a non-reflective part which does not reflect the detection light and the other part may be made to reflect the detection light, and it may be judged that the connecting member 11 exceeds the tilting limit when the reflected detection light is detected.

Figure 8:
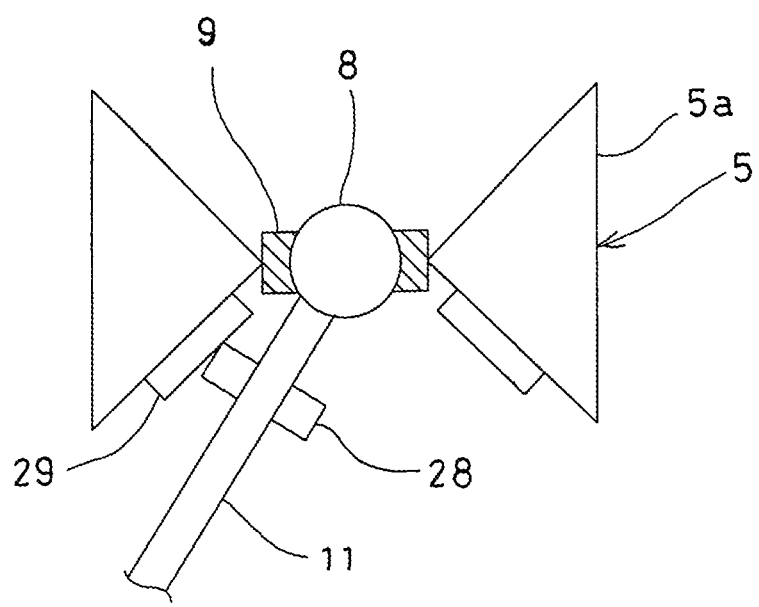
FIG. 8 is an explanatory drawing of a principal portion of a second detecting means.

FIG. 8 shows a second detecting means.

In the second detecting means, a first contact 28 in the shape of a ring is provided on the connecting member 11, and a second contact 29 is provided on the prisms 5a in positions facing the first contact 28 as to surround the first contact 28. A predetermined voltage is applied to the first contact 28 and the second contact 29. When the connecting member 11 is tilted and an amount of tilting exceeds a required amount, the first contact 28 and the second contact 29 come into contact with each other, and an electric current passes between the first contact 28 and the second contact 29, and it is determined that the connecting member 11 exceeds the tilting limit.

It is to be noted that, in the embodiments described above, the support member 3 is one rod-like member. However, the support member 3 may be formed as a bipod or tripod support member. In this case, each leg is formed as a telescopic leg, and the support member 3 is made inclinable by making the leg telescope, and a support point of the omnidirectional prism 5 can be displaced in a horizontal direction.

The invention claimed is:

1. A survey setting point indicating device comprising a support member which can be tilted with respect to a vertical direction, a connecting member which can be freely tilted with respect to said support member and hangs vertically downward by gravity, a laser pointer which is provided at a lower end of said connecting member, is concentric with an axis of said connecting member and emits a laser beam vertically downward, and a reflector provided such that the axis of said connecting member passes through a center of said reflector.

2. The survey setting point indicating device according to claim 1, wherein said support member is a rod-like member which can be rotated torsionally with a lower end of said support member as a center, a prism support part extends from said support member in a horizontal direction, and said connecting member is supported by said prism support part.

3. The survey setting point indicating device according to claim 2, wherein said reflector is an omnidirectional prism which is fixed to said support member and has a space at a center portion, a spherical body is rotatably accommodated in the space, and said connecting member hangs down from said spherical body.

4. The survey setting point indicating device according to claim 3, wherein at a top portion of said spherical body, a reflection part or a non-reflective part corresponding to a tilting limit of said connecting member is provided, a photosensor is provided so as to face said reflection part or said non-reflective part, and the tilting limit of said connecting member is detected by detecting a boundary of said reflection part or said non-reflective part by said photosensor.

5. The survey setting point indicating device according to claim 3, wherein a first contact is provided on said connecting member, a second contact is provided on said omnidirectional prism in a portion facing said first contact, and a voltage is applied between said first contact and said second contact, and wherein when said connecting member is tilted and said first contact makes contact with said second contact, the tilting limit of said connecting member is detected.

6. The survey setting point indicating device according to any one of claims 3 to 5, wherein a hood is provided at a lower end of said omnidirectional prism, and said laser pointer is surrounded with said hood.

7. The survey setting point indicating device according to claim 2, wherein said connecting member is provided in such manner that said connecting member can be freely tilted with respect to said support member, said reflector is an omnidirectional prism having a space at a center portion, said connecting member passes through the space, and said reflector is fixed to said connecting member.

8. The survey setting point indicating device according to claim 7, wherein at an upper end of said connecting member, another laser pointer is provided, and a laser beam is emitted upward from said another laser pointer.

* * * * *